(12) United States Patent
Stolarczyk et al.

(10) Patent No.: US 7,407,209 B2
(45) Date of Patent: Aug. 5, 2008

(54) VEHICLE GRAB HANDLE

(75) Inventors: Darryl Stolarczyk, Highland, MI (US); Rabih Kobrossy, Windsor (CA)

(73) Assignee: Nissan Technical Center North America, Inc. MI (US)

( * ) Notice: Subject to any disclaimer, the term of this patent is extended or adjusted under 35 U.S.C. 154(b) by 259 days.

(21) Appl. No.: 11/362,504

(22) Filed: Feb. 27, 2006

(65) Prior Publication Data
US 2007/0200380 A1   Aug. 30, 2007

(51) Int. Cl.
*B60J 9/00* (2006.01)
(52) U.S. Cl. ............................ 296/1.02; 224/927
(58) Field of Classification Search ............... 296/1.02, 296/214; 224/927
See application file for complete search history.

(56) References Cited

U.S. PATENT DOCUMENTS 5,662,375 A * 9/1997 Adams et al. ............... 296/214
6,499,782 B2 12/2002 Kwon
6,647,594 B1 11/2003 Deb et al.
6,829,812 B2 * 12/2004 Ozios et al. ................. 296/214

FOREIGN PATENT DOCUMENTS

EP        0852191 B1   7/1998
EP        1125789 B1   8/2001

* cited by examiner

*Primary Examiner*—Lori L Lyjak
(74) *Attorney, Agent, or Firm*—Global IP Counselors

(57) ABSTRACT

An interior handle assembly includes a vehicle structural member, a handle and a mounting fastener. The handle has a grip portion and a first base mounting portion. The mounting fastener extends between the first base mounting portion and the vehicle structural member fixedly attaching the handle to the vehicle structural member. One of the handle and the vehicle structural member has a selective sliding movement arrangement to provide relative movement of the handle during an impact.

35 Claims, 10 Drawing Sheets

VEHICLE GRAB HANDLE

BACKGROUND OF THE INVENTION

1. Field of the Invention

The present invention generally relates to a vehicle grab handle. More specifically, the present invention relates to a vehicle grab handle mounted on an interior portion of a vehicle structural member.

2. Background Information

Grab handles are well known vehicle elements that are usually mounted within the vehicle as a convenience to passengers and drivers. For instance, the passenger can grip the grab handle for comfort while riding in the vehicle or use the grab handle to assist in movements in and out of the vehicle. As such, grab handles are typically rigidly attached to structural elements within the vehicle adjacent to door openings.

Typically, grab handles are mounted at various locations within the vehicle using a pair of mounting bolts, e.g., one bolt at each end of the handle. The grab handle would typically have a circular hole in each end of the handle for receiving one of the mounting bolts therethrough. The mounting bolts are then threaded into a body structure of the vehicle. This type of design does not allow for any relative movement between the handle and the body structure of the vehicle to which it is mounted. In other words, if an object should happen to impact against this typical grab handle, then the grab handle would not move relative to the body structure of the vehicle to which it is mounted.

In view of the above, it will be apparent to those skilled in the art from this disclosure that there exists a need for an improved grab handle. This invention addresses this need in the art as well as other needs, which will become apparent to those skilled in the art from this disclosure.

SUMMARY OF THE INVENTION

It has been discovered that in order to absorb impact energy, a grab handle can be configured to move slightly in response to impact.

One object of the present invention is to provide a grab handle design with impact energy absorbing features.

Another object of the present invention is to provide a grab handle with attachment to a vehicle structural member that allows limited movement of the grab handle in response to impact.

According to one aspect of the present invention, a vehicle interior handle assembly includes a vehicle structural member, a handle and a mounting fastener. The handle has a grip portion and a first base mounting portion. The mounting fastener extends between the first base mounting portion and the vehicle structural member fixedly attaching the handle to the vehicle structural member with one of the handle and the vehicle structural member having a selective sliding movement arrangement to provide relative movement of the handle during an impact.

According to another aspect of the present invention, a vehicle interior handle includes a grip portion and a first base mounting portion coupled to the grip portion with an elongated mounting slot formed in the first base mounting portion.

According to still another aspect of the present invention, a mounting assembly for a vehicle component includes a vehicle structural member, a vehicle component and a fastener. The vehicle component has a first mounting portion. The fastener extends between the first mounting portion of the vehicle component and the vehicle structural member fixedly attaching the vehicle component to the vehicle structural member with one of the vehicle component and the vehicle structural member having a selective sliding movement arrangement to provide relative movement of the vehicle component during an impact.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
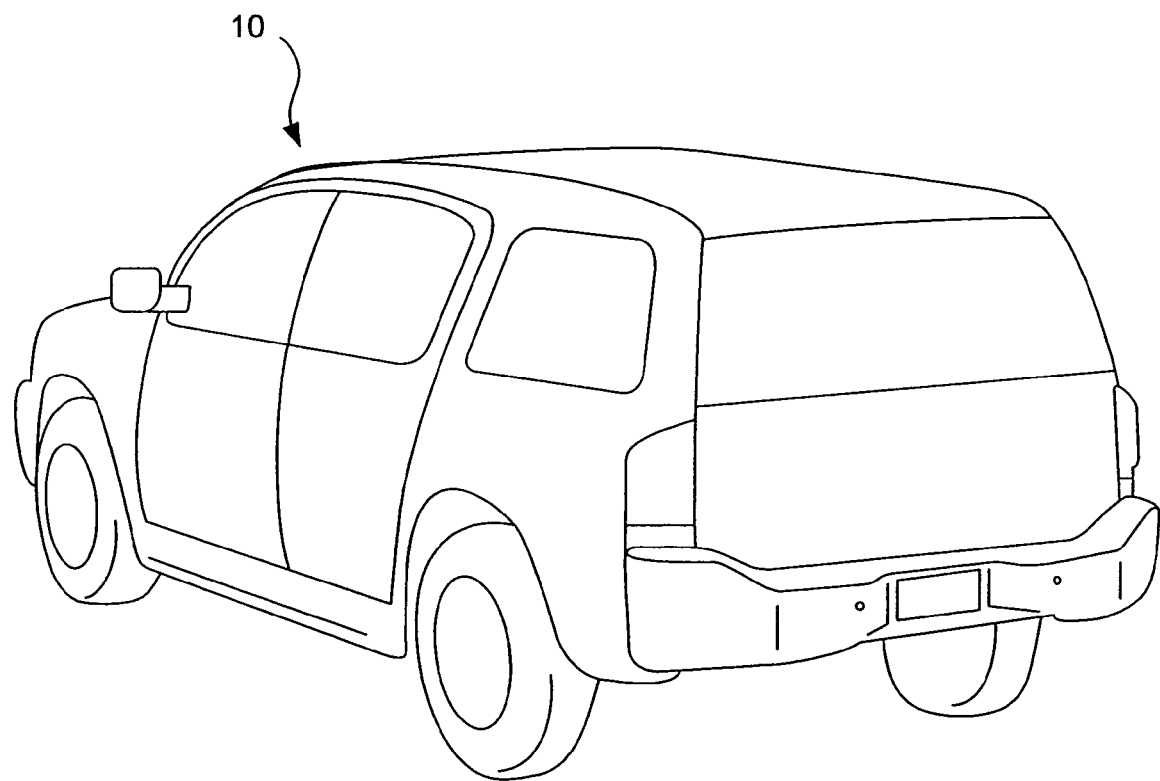
FIG. 1 is a perspective view of a vehicle that includes a grab handle assembly in accordance with the present invention.
Figure 2:
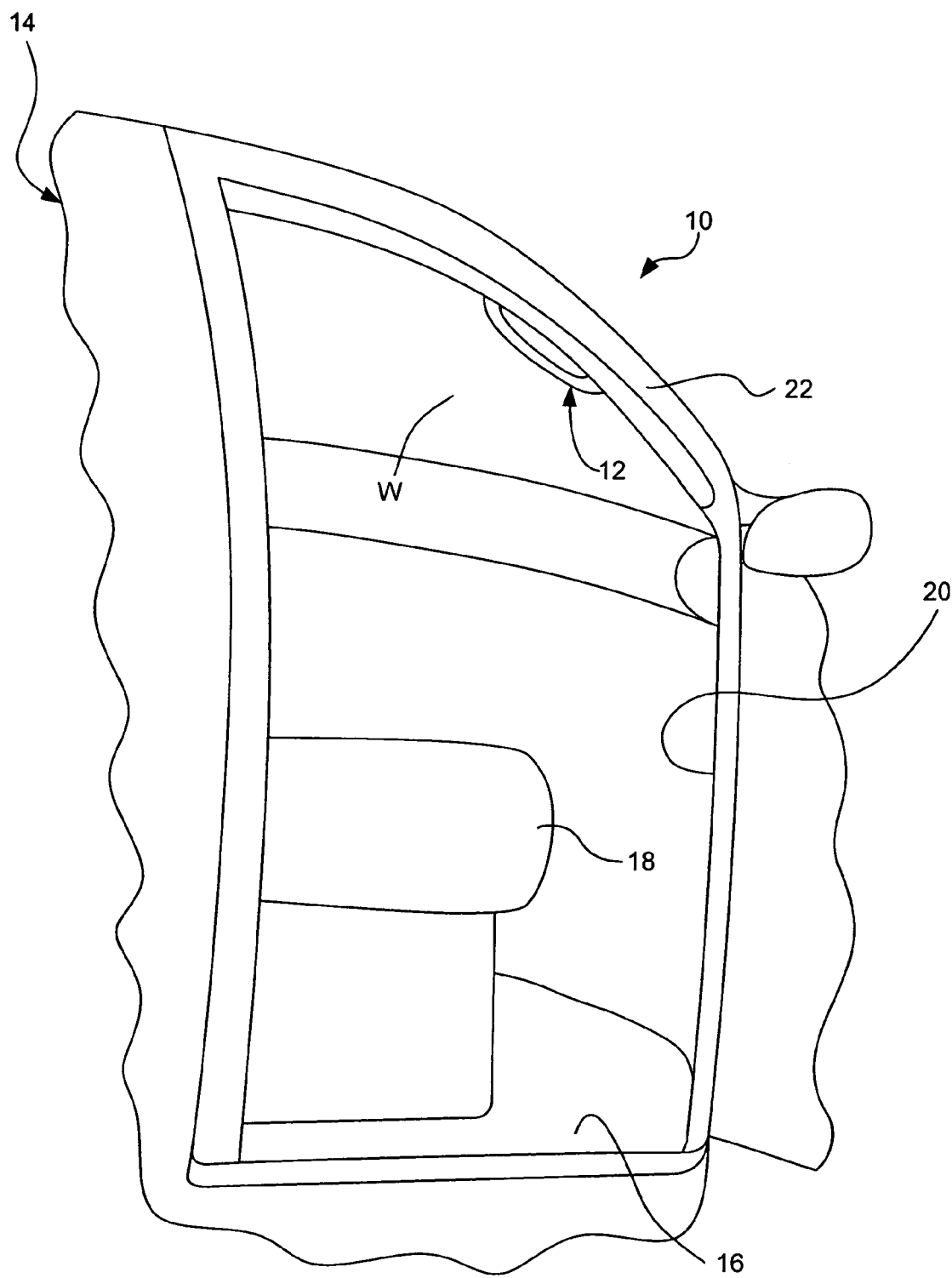
FIG. 2 is a fragmentary side perspective view a portion of the vehicle depicted in FIG. 1 with a passenger door removed to show a front seat, an A-pillar and a grab handle attached to the A-pillar in accordance with the present invention.

Referring initially to FIGS. 1 and 2, a vehicle 10 having a vehicle interior handle assembly 12 (FIG. 2) is illustrated in accordance with a first embodiment of the present invention. The handle assembly 12 is configured to move in response to impact thereby absorbing impact energy.

Figure 3:
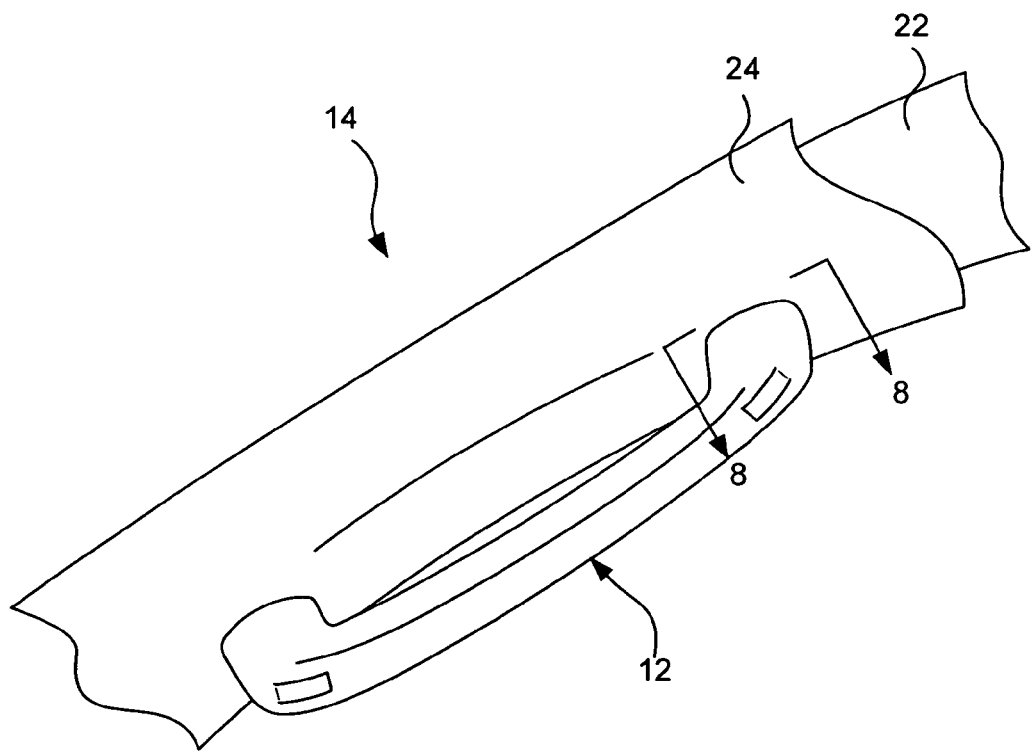
FIG. 3 is a fragmentary perspective view of a portion of the A-pillar and the grab handle in accordance with the present invention.
Figure 4:
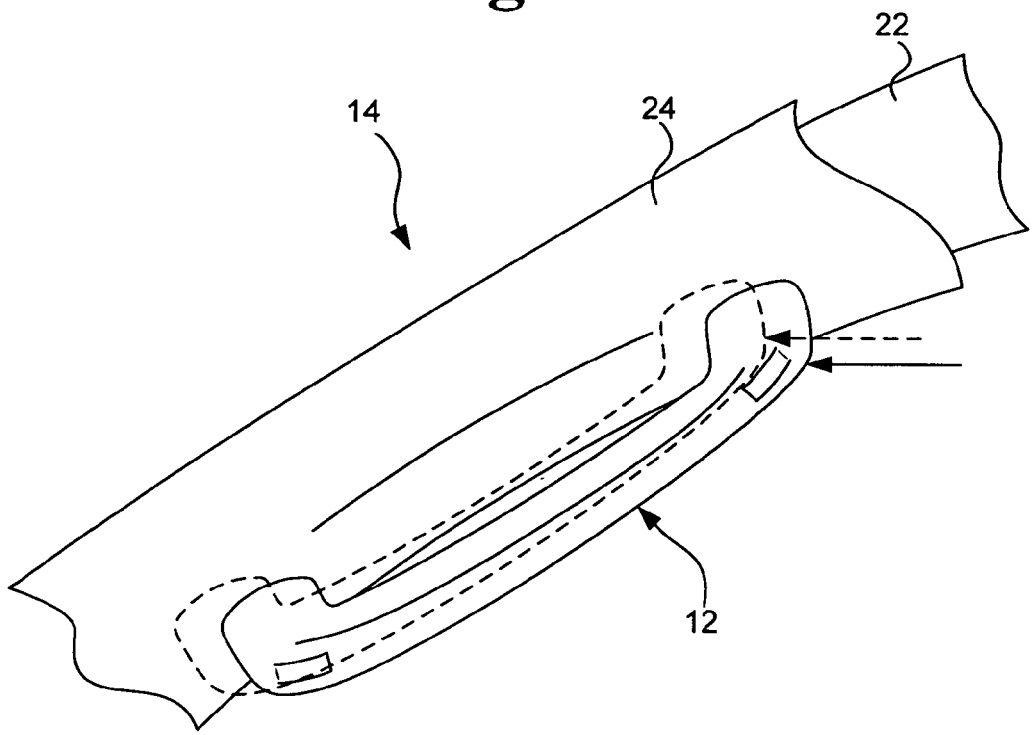
FIG. 4 is another perspective view similar to FIG. 3 of the A-pillar and the grab handle and in phantom the grab handle after impact absorbing movement in accordance with the present invention.

With specific reference to FIG. 2, a brief description is now provided of selected parts of the vehicle 10 that will aid in understanding the present invention. The vehicle 10 includes, among other features, a vehicle body structure 14 having a floor 16 with a seat 18 mounted on the floor 16 adjacent to a door opening 20 and a pillar 22. The pillar 22 is generally upright structural member of the vehicle structure 14 that preferably supports and is connected to a roof of the vehicle 10. The pillar 22 is generally referred to as an A-pillar located between the door opening 20 and a wind shield W, as shown in FIG. 2. In most vehicle designs, the pillar 22 is covered by an interior trim portion 24 as indicated in FIGS. 3, 4 and 5.

Figure 5:
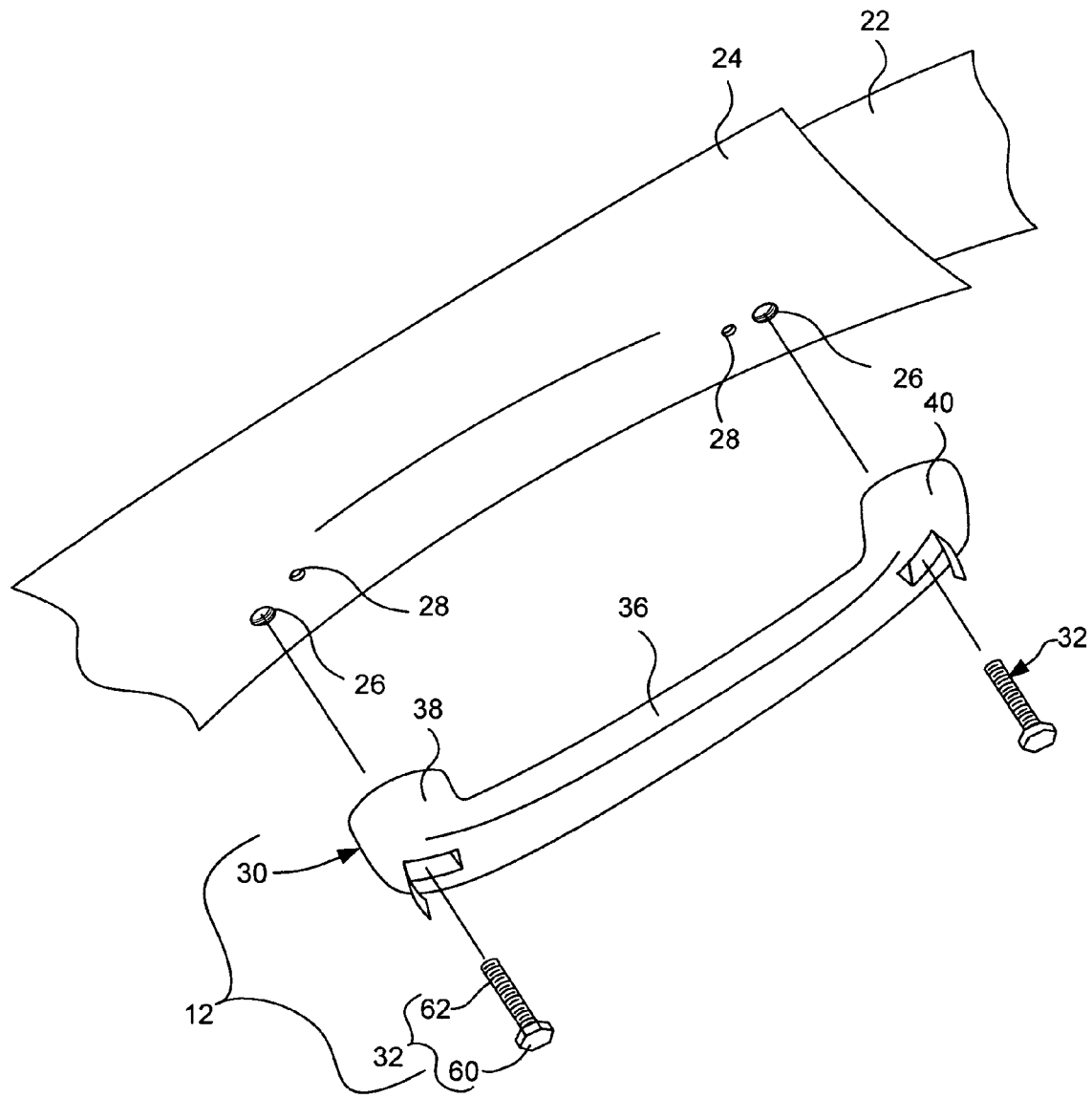
FIG. 5 an exploded perspective view showing the A-pillar, the grab handle and fasteners of the grab handle assembly in accordance with the present invention.

The pillar 22 (and the interior trim portion 24) includes a pair of mounting apertures 26 and a pair of locator pin apertures 28 as shown in FIG. 5. The mounting apertures 26 are preferably a threaded nut (not shown) welded or otherwise fixed to an inner side of the pillar 22 but can alternatively be threaded holes.

With specific reference to FIGS. 5, 6, 7 and 8, a description of handle assembly 12 is now provided. The handle assembly 12 basically includes a handle 30 and a mounting fastener 32. The handle 30 is preferably formed of molded plastic, resin and/or polymer material and basically includes a grip portion 36, a first base mounting portion 38 and a second base mounting portion 40. The handle 30, the grip portion 36 and first and second base mounting portions 38 and 40 are integrally formed as a single member by any of variety of molding processes and techniques.

The grip portion 36 is a generally elongated member having a longitudinal axis A (FIGS. 6 and 7) that extends in a first direction. The grip portion 36 and the axis A extend between the first and second base mounting portions 38 and 40. The first base mounting portion 38 and the second base mounting portion 40 are depicted as being generally symmetric or mirror images of one another. However it should be understood that the first and second base mounting portions 38 and 40 can have different shapes depending upon aesthetic and other design considerations. However, both the first base mounting portion 38 and second mounting portion 40 have generally the same features and therefore description of one applies to the other. For the sake of brevity, only the first base mounting portion 38 will be provided below.

Figure 8:
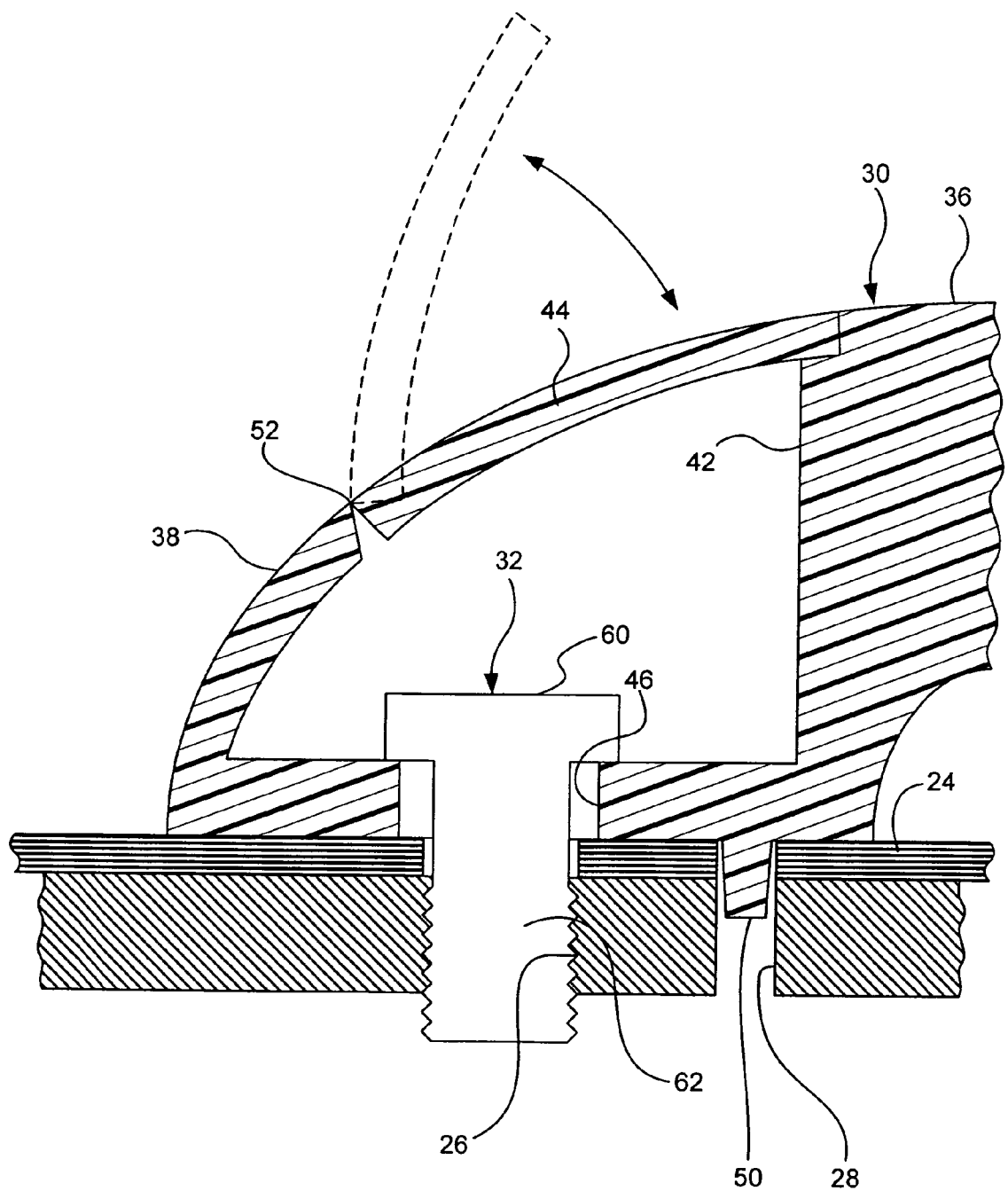
FIG. 8 is an enlarged cross-sectional view of the grab handle taken along section line 8-8 in FIG. 3 showing the grab handle, the elongated slot and the alignment protrusion in a mounting orientation in accordance with the first embodiment of the present invention.

As shown in FIG. 8, the first base mounting portion 38 includes a fastener recess 42, a cover 44, an elongated slot 46 and a locator pin 50. The fastener recess 42 is a hollow portion of the first base mounting portion 38 that allows for easy installation of the fastener 32. The fastener recess 42 is depicted only in FIG. 8. The cover 44 is preferably a hinged element integrally formed with the handle 30. The cover 44 can be opened to expose the fastener recess 40. With the cover 44 closed, the fastener recess 42 is covered and the fastener 32 concealed. The cover 44 is preferably formed with a living hinge 52. The cover 44 hinges is about the living hinge 52 revealing the recess 42 and allowing for installation of the mounting fastener 32.

Figure 7:
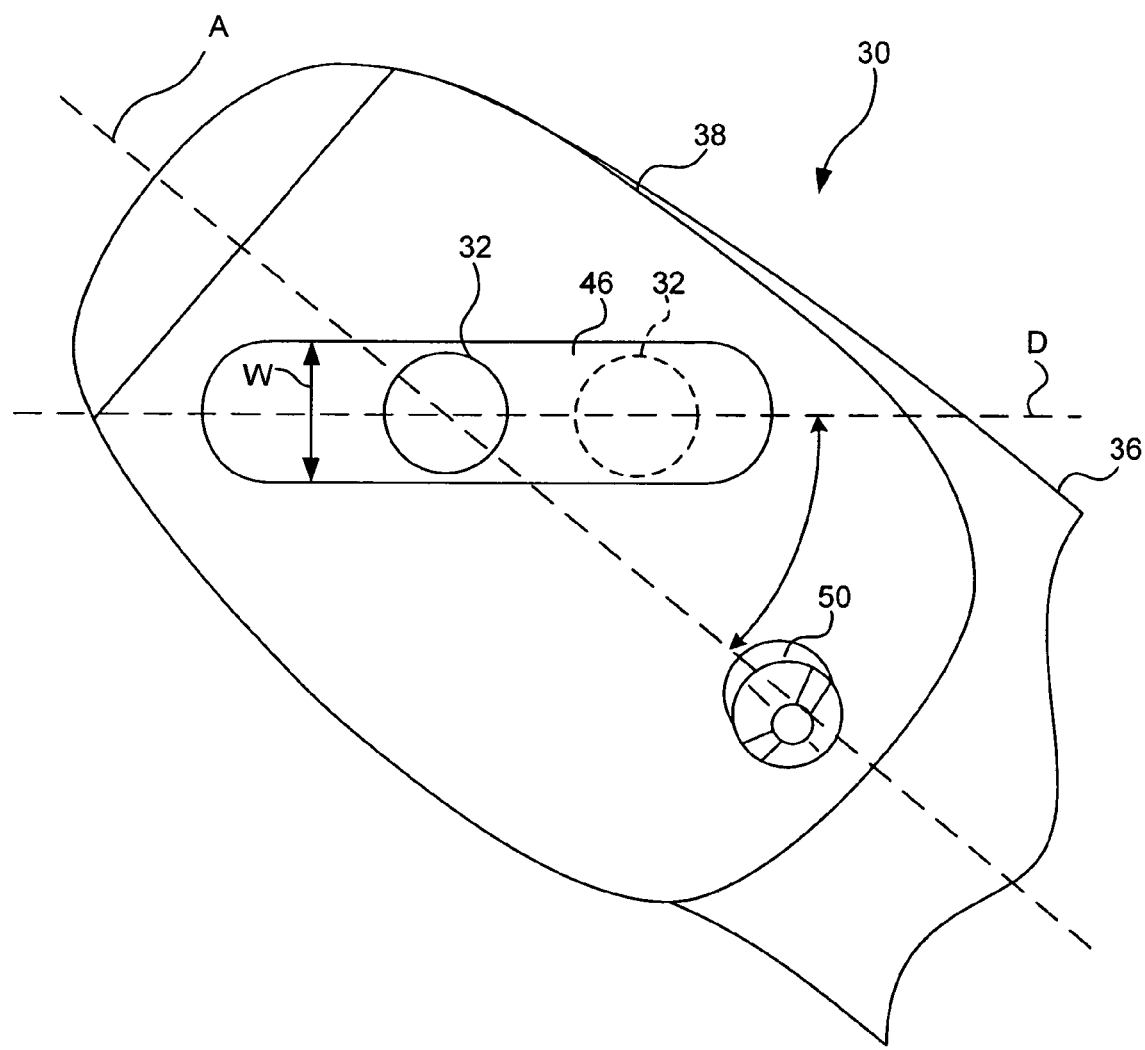
FIG. 7 is an enlarged fragmentary perspective view of one of the mounting portions of the grab handle depicted in FIG. 6 showing the elongated slot and the alignment protrusion in accordance with the first embodiment of the present invention.

The elongated slot 46 extends in a second direction D that is angularly offset from the first direction of the longitudinal axis A as shown in FIG. 7. The elongated slot 46 has a generally constant width W with rounded ends, as shown in FIG. 7. The angular offset of the elongated slot 46 is an engineering consideration that is dependent upon, for example, an angle of inclination of the pillar 22 and desired direction of movement of the handle assembly 12 in response to impact. For example, in the first embodiment outboard movement of the handle 30 in response to impact is preferred.

The locator pin 50 is preferably dimensioned with a shear strength that is less than the shear strength of the mounting fastener 32. The locator pin 50 is preferably aligned with the longitudinal axis A, adjacent to the elongated slot 46. However it should be understood that the locator pin 50 can alternatively be positioned in any of a variety of locations on the first base mounting portion 38 depending upon installation location of the handle assembly 12 within the vehicle 10 and/or angularly offset of the elongated slot 46. The locator pin 50 is further dimensioned to be inserted in the locator pin aperture 28 in the pillar 22 as shown in FIG. 8. Preferably, the locator pin 50 is small and easily sheared off in response to lateral force and is generally provided for alignment of the handle 30 during installation only.

Figure 9:
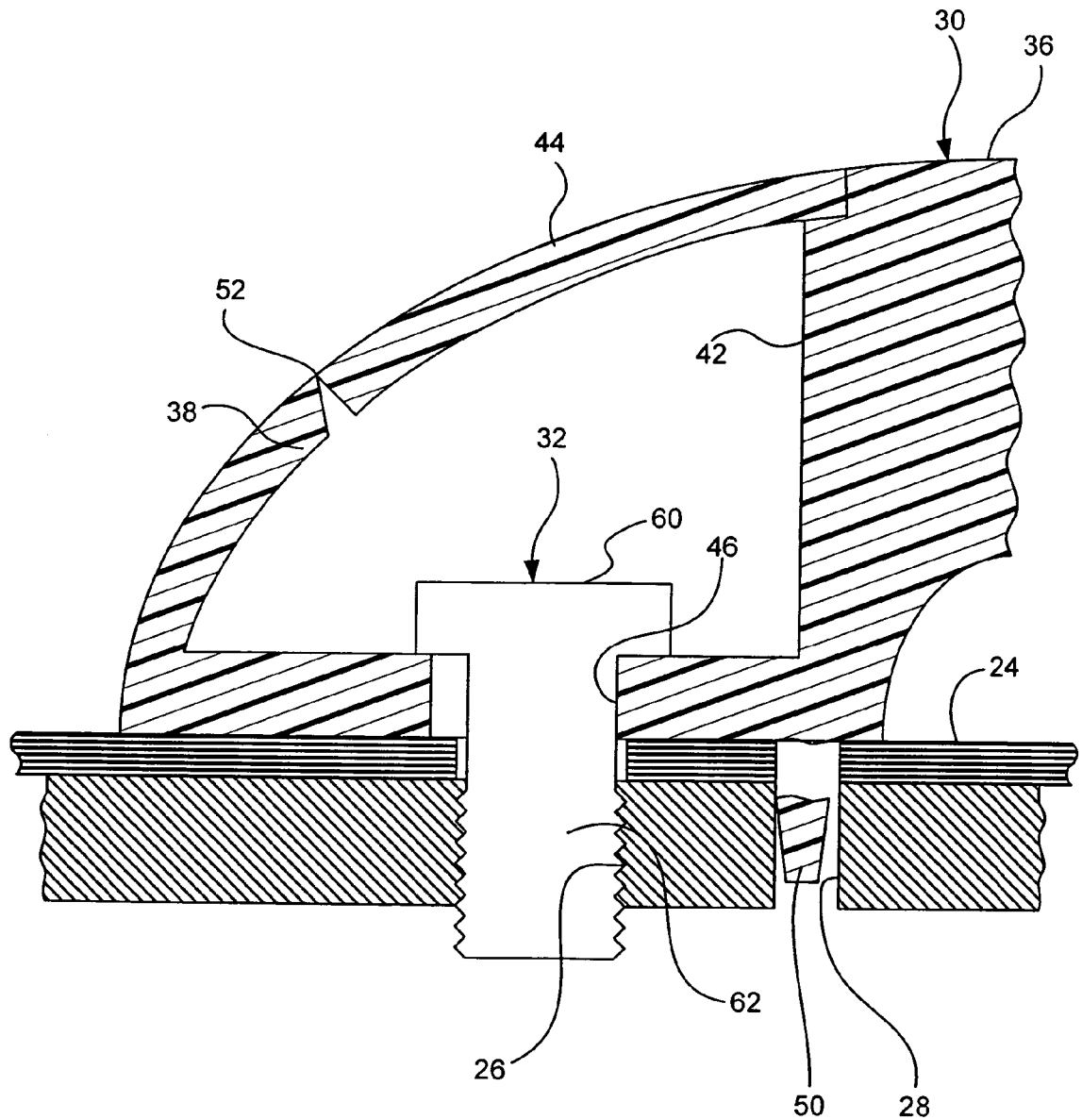
FIG. 9 is an enlarged cross-sectional view, similar to that in FIG. 8, of the grab handle in an impacted orientation moved from the mounting orientation relative to the fastener and the A-pillar, with the alignment protrusion sheared off in accordance with the first embodiment of the present invention.

The mounting fastener 32 includes a head portion 60 and a threaded portion 62 as shown in FIGS. 5, 8 and 9. When installed, the head portion 60 of the mounting fastener 32 is disposed within the fastener recess 42 of the first base mounting portion 38. Further, the threaded portion 62 of the mounting fastener 32 extends through the elongated slot 46 and into the mounting aperture 26 of the pillar 22. Consequently, the threaded portion 62 of the mounting fastener 32 extends between the first base mounting portion 38 and the pillar 22 thereby fixedly attaching the handle 32 to the pillar 22. Since the mounting aperture 26 in the pillar 22 includes machine threads, mounting fastener 32 is in threaded engagement with the mounting aperture 26.

Figure 6:
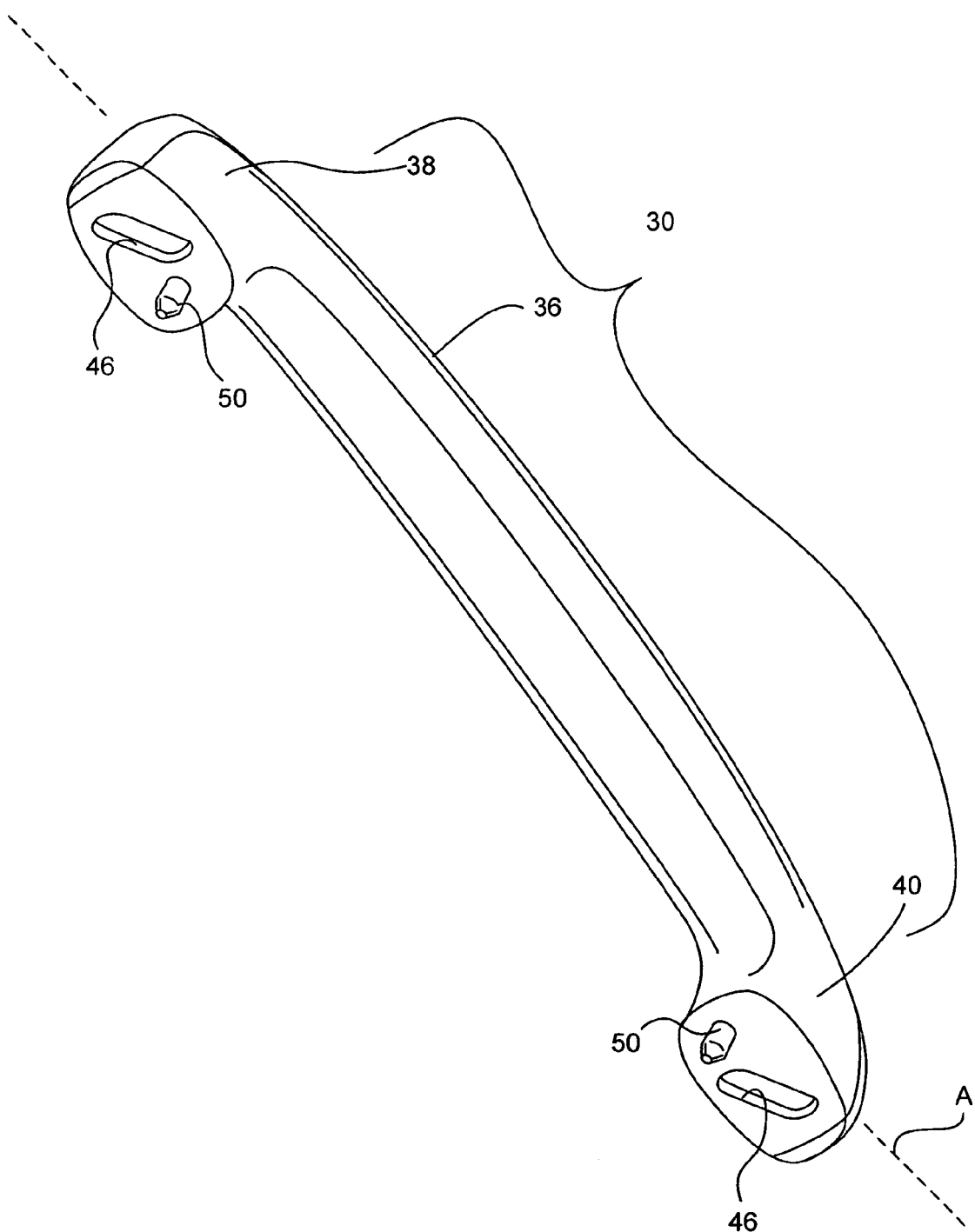
FIG. 6 is a perspective view of the grab handle removed from the A-pillar showing mounting portions of the grab handle, each mounting portion having an elongated slot and an alignment protrusion in accordance with a first embodiment of the present invention.

As indicated in FIG. 6, the mounting fastener 32 is generally centered within the elongated slot 46 of the handle 30 with the handle 30 in a mounting orientation. However, in alternative configuration, the mounting fastener 32 can be off-center in the mounting orientation, depending upon design considerations.

As shown in FIG. 4 in solid lines, the handle 30 is mounted to the pillar 22 in a mounting orientation. However, in response to impact, the handle 30 can move to an impacted orientation shown in dashed lines in FIG. 3. FIG. 8 shows the handle 30 in the mounting orientation and FIG. 9 shows the handle in the impacted orientation. As shown in FIG. 9, the locator pin 50 has sheared off in response to movement of the handle 30 from the mounting orientation to the impacted orientation. Further, as shown in FIG. 9, the handle 30 has moved along the length of the elongated slot 46 relative to the fastener 32.

The elongated slot 46 provides the handle with a selective sliding movement arrangement. The selective sliding movement arrangement allows the handle 30 to move from the mounting orientation to the impacted orientation in response to rapid impact on the handle 30. In the first embodiment, the selective sliding movement arrangement preferably provides the handle 30 with outboard movement in response to impact. In the mounting orientation (FIG. 8) the mounting fastener 32 is approximately centered in the elongated slot 46 as indicated in solid lines in FIGS. 7 and 8. In response to movement of the handle 30 from the mounting orientation to the impacted orientation, the locator pin 50 is sheared off (FIG. 9) thereby allowing handle 30 to move. More specifically the base mounting portions 38 and 40 respond to impact such that the locator pins 50 shear off allowing the handle to move from the mounting orientation to the impacted orientation. Further, with the handle 30 moved to the impacted orientation, the mounting fastener 32 is now offset within the elongated slot 46 as shown in dashed lines in FIG. 7 and as also shown in FIG. 9.

It should be understood from the drawings and the description herein that the selective sliding movement arrangement of the handle assembly 12 can be used on any of a variety of vehicle components and need not be restricted to a handle assembly per se. The handle assembly 12 is only one example of a vehicle component provided with the sliding movement arrangement of the present invention. Further, the elongated slot 46 can be formed in the structural member of the vehicle instead of in the vehicle component such as the handle assembly 12, thereby allowing movement of the vehicle component relative to the structural member along the length of the elongated slot formed in the structural member.

Second Embodiment

Figure 10:
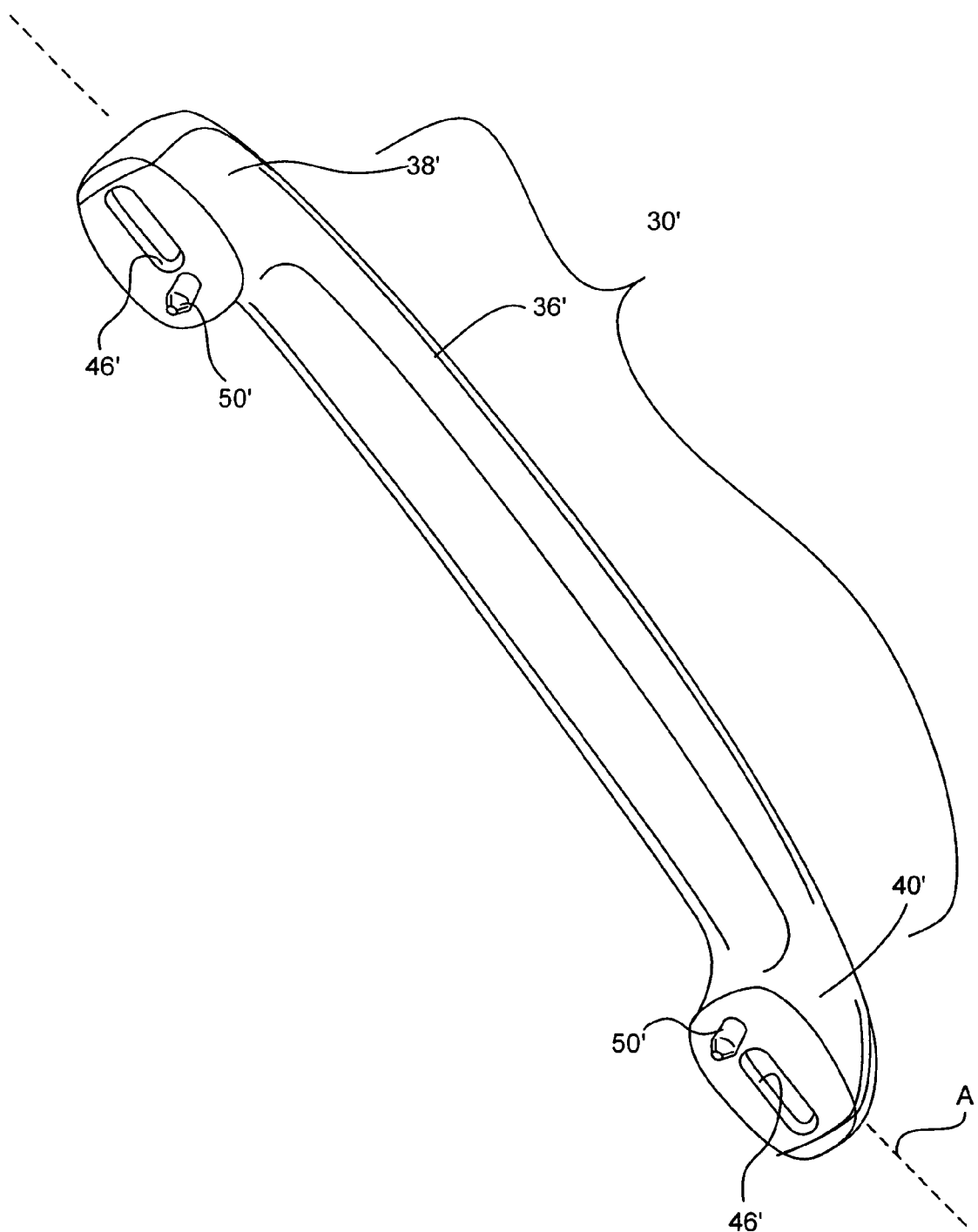
FIG. 10 is a perspective view, similar to FIG. 6, of a grab handle in accordance with a second embodiment of the present invention.
Figure 11:
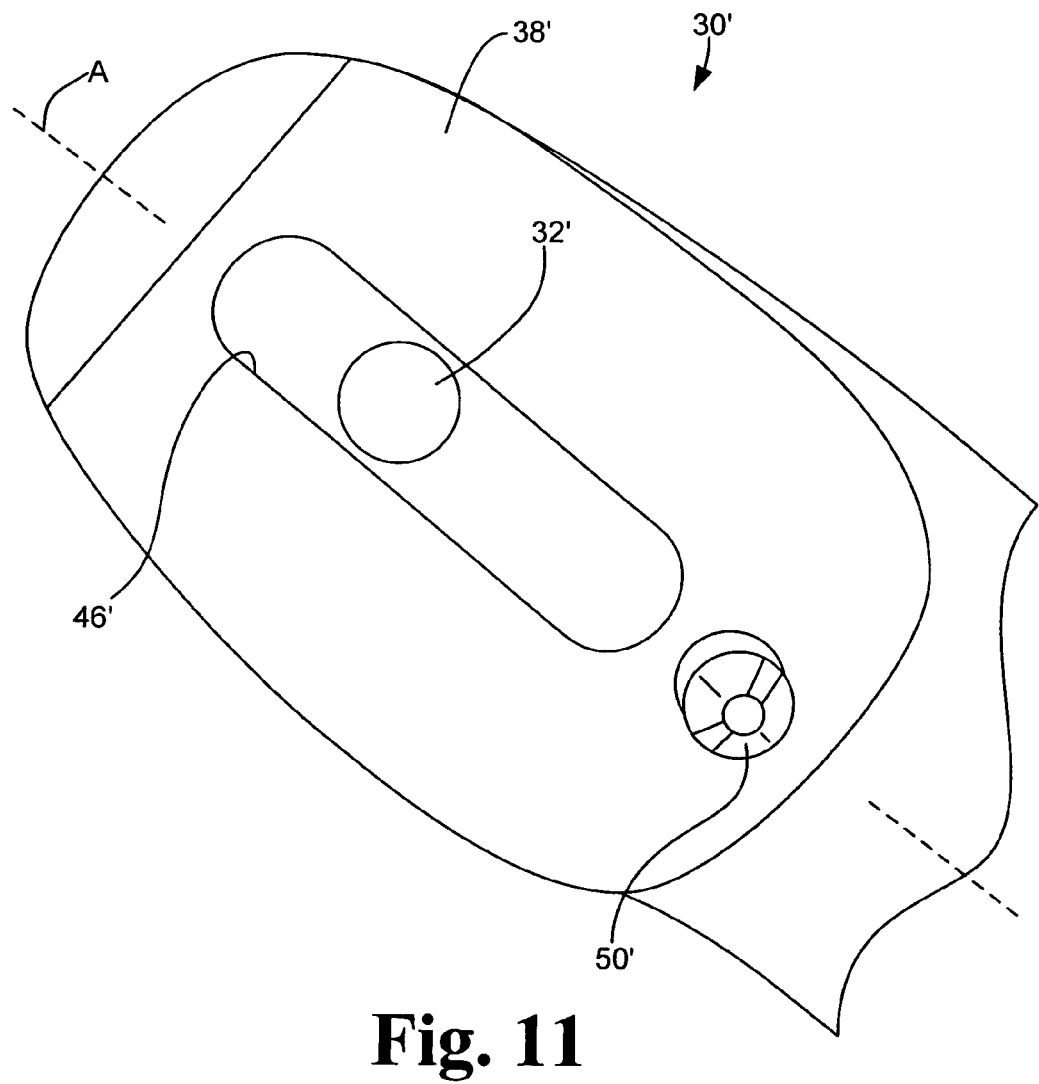
FIG. 11 is an enlarged fragmentary perspective view, similar to FIG. 7, of one of the mounting portions of the grab handle depicted in FIG. 10 showing the elongated slot and the alignment protrusion in accordance with the second embodiment of the present invention.

Referring now to FIGS. 10 and 11, a handle 30' of a handle assembly in accordance with a second embodiment will now be explained. In view of the similarity between the first and second embodiments, the descriptions of the parts of the second embodiment that are identical to the parts of the first embodiment may be omitted for the sake of brevity. Basically, in the second embodiment, the handle 30' includes a grip portion 36' and a first base mounting portion 38' and a second base mounting portion 40' that are identical to the first embodiment but for the orientation of an elongated slot 46' of each of the base mounting portions 38' and 40'. Thus, as with the first embodiment, description of the first base mounting portion 38' applies to features in common with the second base mounting portion 40'.

Each of the base mounting portions 38' and 40' also includes a locator pin 50' similar to the first embodiment. The overall function and purpose of the elongated slot 46' and the locator pin 50' are generally the same as in the first embodiment. However, in the second embodiment, the elongated slot 46' extends in a direction generally parallel to or coinciding with the longitudinal axis A of the handle 30'.

General Interpretation of Terms

As used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle interior handle assembly comprising:
   a vehicle structural member;
   a handle having a grip portion and a first base mounting portion; and
   a mounting fastener extending between the first base mounting portion and the vehicle structural member fixedly attaching the handle to the vehicle structural member with one of the handle and the vehicle structural member having a selective sliding movement arrangement configured to provide relative movement of the handle in a direction parallel to the vehicle structural member during an impact.

2. The vehicle interior handle assembly as set forth in claim 1, wherein
   the selective sliding movement arrangement includes an elongated slot formed in the first base mounting portion of the handle with the mounting fastener extending through the elongated slot.

3. A vehicle interior handle assembly comprising:
   a vehicle structural member;
   a handle having a grip portion and a first base mounting portion; and
   a mounting fastener extending between the first base mounting portion and the vehicle structural member fixedly attaching the handle to the vehicle structural member with one of the handle and the vehicle structural member having a selective sliding movement arrangement to provide relative movement of the handle during an impact, the selective sliding movement arrangement includes an elongated slot formed in the first base mounting portion of the handle with the mounting fastener extending through the elongated slot,
   the grip portion being a generally elongated member having a longitudinal axis extending in a first direction; and
   the elongated slot having an elongated width extending in a second direction that is angularly offset from the first direction.

4. The vehicle interior handle assembly as set forth in claim 2, wherein
   the grip portion is a generally elongated member having a longitudinal axis extending in a first direction; and
   the elongated slot has an elongated width extending generally parallel to the first direction.

5. The vehicle interior handle assembly as set forth in claim 2, wherein
   the vehicle structural member has a mounting aperture with the fastener being fixed therein.

6. The vehicle interior handle assembly as set forth in claim 5, wherein
   the fastener is approximately centered in the elongated slot with the handle in a mounting orientation.

7. The vehicle interior handle assembly as set forth in claim 1, wherein
   the first base mounting portion includes an installation locator pin; and
   the vehicle structural member includes a corresponding locator pin aperture with the installation locator pin disposed therein.

8. The vehicle interior handle assembly as set forth in claim 7, wherein
   the installation locator pin is arranged and configured with a shear strength that is less than a shear strength of the mounting fastener.

9. A vehicle interior handle assembly comprising:
a vehicle structural member;
a handle having a grip portion and a first base mounting portion; and
a mounting fastener extending between the first base mounting portion and the vehicle structural member fixedly attaching the handle to the vehicle structural member with one of the handle and the vehicle structural member having a selective sliding movement arrangement to provide relative movement of the handle during an impact, the vehicle structural member being a vehicle pillar.

10. The vehicle interior handle assembly as set forth in claim 1, wherein
the mounting fastener includes a threaded portion and a head portion.

11. The vehicle interior handle assembly as set forth in claim 10, wherein
the head portion of the mounting fastener is disposed within the mounting portion of the handle.

12. The vehicle interior handle assembly as set forth in claim 1, wherein the handle further includes a second base mounting portion with the grip portion extending between the first and second base mounting portions.

13. The vehicle interior handle assembly as set forth in claim 12, wherein
the grip portion and the first and second base mounting portions are formed unitarily as a single member.

14. The vehicle interior handle assembly as set forth in claim 1, wherein
the grip portion is a generally elongated member having a longitudinal axis extending in a first direction; and
the selective sliding movement arrangement provides relative movement of the handle along the first direction.

15. The vehicle interior handle assembly as set forth in claim 1, wherein
the grip portion is a generally elongated member having a longitudinal axis extending in a first direction; and
the selective sliding movement arrangement provides relative movement of the handle along a second direction that is angularly offset from the first direction.

16. A vehicle interior handle comprising:
a grip portion; and
a first base mounting portion coupled to the grip portion with an elongated mounting slot formed in the first base mounting portion, the elongated mounting slot configured and arranged to provide selective sliding movement of the first base mounting portion,
the grip portion being a generally elongated member having a longitudinal axis extending in a first direction; and
the elongated mounting slot having an elongated width extending in a second direction that is angularly offset from the first direction.

17. The vehicle interior handle as set forth in claim 16, wherein
the first base mounting portion includes an installation locator pin adjacent to the elongated mounting slot.

18. The vehicle interior handle as set forth in claim 17, wherein
the installation locator pin is configured with a shear strength that is less than a shear strength of a mounting fastener.

19. The vehicle interior handle as set forth in claim 6, further comprising
a second base mounting portion coupled to the grip portion such that the grip portion is an elongated member with the first base mounting portion and the second first base mounting portion formed at opposite ends.

20. A vehicle interior handle comprising:
a grip portion;
a first base mounting portion coupled to the grip portion with an elongated mounting slot formed in the first base mounting portion, the elongated mounting slot configured and arranged to provide selective sliding movement of the first base mounting portion; and
a second base mounting portion coupled to the grip portion such that the grip portion is an elongated member with the first base mounting portion and the second first base mounting portion formed at opposite ends, the grip portion and the first and second base mounting portions being formed unitarily as a single member.

21. The vehicle interior handle assembly as set forth in claim 9, wherein
the selective sliding movement arrangement includes an elongated slot formed in the first base mounting portion of the handle with the mounting fastener extending through the elongated slot.

22. The vehicle interior handle assembly as set forth in claim 21, wherein
the grip portion is a generally elongated member having a longitudinal axis extending in a first direction; and
the elongated slot has an elongated width extending in a second direction that is angularly offset from the first direction.

23. The vehicle interior handle assembly as set forth in claim 21, wherein
the grip portion is a generally elongated member having a longitudinal axis extending in a first direction; and
the elongated slot has an elongated width extending generally parallel to the first direction.

24. The vehicle interior handle assembly as set forth in claim 9, wherein
the first base mounting portion includes an installation locator pin; and
the vehicle structural member includes a corresponding locator pin aperture with the installation locator pin disposed therein.

25. The vehicle interior handle assembly as set forth in claim 24, wherein
the installation locator pin is arranged and configured with a shear strength that is less than a shear strength of the mounting fastener.

26. The vehicle interior handle assembly as set forth in claim 9, wherein
the handle further includes a second base mounting portion with the grip portion extending between the first and second base mounting portions.

27. The vehicle interior handle assembly as set forth in claim 26, wherein
the grip portion and the first and second base mounting portions are formed unitarily as a single member.

28. A vehicle interior handle assembly comprising:
a vehicle structural member;
a handle having a grip portion and a first base mounting portion, the first base mounting portion having a selective sliding movement arrangement and a cover configured to cover the selective sliding movement arrangement; and
a mounting fastener extending between the selective sliding movement arrangement and the vehicle structural member fixedly attaching the handle to the vehicle structural member, the selective sliding movement arrangement configured to provide relative movement of at least the first base mounting portion and the cover of the handle relative to the vehicle structural member during an impact.

29. The vehicle interior handle assembly as set forth in claim 28, wherein
the selective sliding movement arrangement includes an elongated slot formed in the first base mounting portion of the handle with the mounting fastener extending through the elongated slot.

30. The vehicle interior handle assembly as set forth in claim 29, wherein
the grip portion is a generally elongated member having a longitudinal axis extending in a first direction; and
the elongated slot has an elongated width extending in a second direction that is angularly offset from the first direction.

31. The vehicle interior handle assembly as set forth in claim 29, wherein
the grip portion is a generally elongated member having a longitudinal axis extending in a first direction; and
the elongated slot has an elongated width extending generally parallel to the first direction.

32. The vehicle interior handle assembly as set forth in claim 28, wherein
the first base mounting portion includes an installation locator pin; and
the vehicle structural member includes a corresponding locator pin aperture with the installation locator pin disposed therein.

33. The vehicle interior handle assembly as set forth in claim 32, wherein
the installation locator pin is arranged and configured with a shear strength that is less than a shear strength of the mounting fastener.

34. The vehicle interior handle assembly as set forth in claim 28, wherein
the handle further includes a second base mounting portion with the grip portion extending between the first and second base mounting portions.

35. The vehicle interior handle assembly as set forth in claim 34, wherein
the grip portion and the first and second base mounting portions are formed unitarily as a single member.

* * * * *